US008660963B2

(12) United States Patent
Hirai et al.

(10) Patent No.: US 8,660,963 B2
(45) Date of Patent: Feb. 25, 2014

(54) CONTENTS COPYING MANAGEMENT SYSTEM, COPYING MANAGEMENT DEVICE, COPYING MANAGEMENT METHOD, CONTENTS COPYING APPARATUS AND CONTENTS COPYING METHOD

(75) Inventors: Jun Hirai, Tokyo (JP); Satoshi Kitani, Tokyo (JP)

(73) Assignee: Sony Corporation, Tokyo (JP)

( * ) Notice: Subject to any disclaimer, the term of this patent is extended or adjusted under 35 U.S.C. 154(b) by 2653 days.

(21) Appl. No.: 10/777,904

(22) Filed: Feb. 13, 2004

(65) Prior Publication Data

US 2004/0230532 A1    Nov. 18, 2004

(30) Foreign Application Priority Data

Feb. 17, 2003    (JP) ................................. 2003-038688

(51) Int. Cl.
*G06F 21/00* (2013.01)
*G06Q 30/00* (2012.01)

(52) U.S. Cl.
USPC .............................................. 705/57; 705/27

(58) Field of Classification Search
USPC ................................ 705/1–22, 25–45, 50–79
See application file for complete search history.

(56) References Cited

U.S. PATENT DOCUMENTS

| | | | | |
|---|---|---|---|---|
| 5,412,718 A | * | 5/1995 | Narasimhalu et al. | 705/51 |
| 5,805,699 A | * | 9/1998 | Akiyama et al. | 705/58 |
| 5,831,714 A | * | 11/1998 | Yoshikawa | 355/40 |
| 5,894,416 A | * | 4/1999 | Kuroyanagi | 700/9 |
| 6,526,010 B1 | * | 2/2003 | Morioka et al. | 369/47.15 |
| 6,571,220 B1 | * | 5/2003 | Ogino et al. | 705/51 |
| 6,687,802 B1 | * | 2/2004 | Kori et al. | 711/163 |
| 6,937,553 B1 | * | 8/2005 | Mitui et al. | 369/84 |
| 7,031,942 B2 | * | 4/2006 | Ogino et al. | 705/51 |
| 7,032,575 B2 | * | 4/2006 | Sims, Jr. | 123/509 |
| 7,178,037 B2 | * | 2/2007 | Shimada et al. | 713/193 |
| 7,184,552 B2 | * | 2/2007 | Okuda et al. | 380/212 |
| 7,246,228 B2 | * | 7/2007 | Sato et al. | 713/100 |
| 7,299,199 B2 | * | 11/2007 | Nomura et al. | 705/26 |
| 7,302,575 B2 | * | 11/2007 | Hars | 713/176 |

(Continued)

FOREIGN PATENT DOCUMENTS

| | | |
|---|---|---|
| JP | 10-83297 | 3/1998 |
| JP | 10-207779 | 8/1998 |
| JP | 2002-328846 A | 11/2002 |
| JP | 2002-334511 A | 11/2002 |

*Primary Examiner* — Alexander Kalinowski
*Assistant Examiner* — Murali Dega
(74) *Attorney, Agent, or Firm* — Oblon, Spivak, McClelland, Maier & Neustadt, L.L.P.

(57) ABSTRACT

The present invention can reliably prevent the contents of a recording medium from being illegally copied but allow them to be copied only for the purpose of personal use. The invention takes out title identifying information and medium identifying information of a DVD loaded on a hard-disk-containing DVD player and transmits those pieces of information to management server along with the apparatus identifying information of the hard-disk-containing DVD player so as to enquire about copying prohibition flag for a copying operation and control copying of the recorded contents of the DVD according to the copying prohibition flag. Thus, the invention prohibits copying when the management server judges that copying of the contents of the DVD by means of the hard-disk-containing DVD player is illegal, whereas it allows copying when the management server judges that copying of the contents of the DVD by means of the hard-disk-containing DVD player is for the purpose of personal use.

9 Claims, 9 Drawing Sheets

(56) References Cited

U.S. PATENT DOCUMENTS

| | | |
|---|---|---|
| 2002/0060963 A1* | 5/2002 | Kobayashi ................ 369/47.55 |
| 2002/0073319 A1* | 6/2002 | Manabe ....................... 713/176 |
| 2002/0114461 A1* | 8/2002 | Shimada et al. ............. 380/201 |
| 2002/0156742 A1* | 10/2002 | Ogino et al. .................... 705/57 |
| 2002/0178145 A1* | 11/2002 | Ishida ............................... 707/1 |
| 2003/0012098 A1* | 1/2003 | Sako et al. ................ 369/47.12 |
| 2003/0050894 A1* | 3/2003 | Kambayashi et al. .......... 705/57 |
| 2003/0149890 A1* | 8/2003 | Shen et al. .................... 713/200 |
| 2004/0028385 A1* | 2/2004 | Kori et al. ....................... 386/94 |
| 2004/0064380 A1* | 4/2004 | Hiratsuka ........................ 705/27 |
| 2004/0133794 A1* | 7/2004 | Kocher et al. ................ 713/193 |
| 2005/0084251 A1* | 4/2005 | Kitahashi et al. ............. 386/124 |
| 2008/0320173 A9* | 12/2008 | Matsushima et al. ............. 710/1 |

* cited by examiner

FIG. 6A

| COMBINATION NO. KNo | TITLE IDENTIFYING INFORMATION It | APPARATUS IDENTIFYING INFORMATION Iddrv | MEDIUM IDENTIFYING INFORMATION Iw | PHASE DIFFERENCE INFORMATION P |
|---|---|---|---|---|
| M000001 | DVD000010 | — | C:¥wavdat¥DVD000010.000 | 0 |
| M000002 | DVD000230 | — | C:¥wavdat¥DVD000230.000 | 0 |
| ... | ... | ... | ... | ... |

FIG. 6B

| COMBINATION NO. KNo | TITLE IDENTIFYING INFORMATION It | APPARATUS IDENTIFYING INFORMATION Iddrv | MEDIUM IDENTIFYING INFORMATION Iw | PHASE DIFFERENCE INFORMATION P |
|---|---|---|---|---|
| M000001 | DVD000010 | — | C:¥wavdat¥DVD000010.000 | 0 |
| U000001 | DVD000010 | HDD000150 | C:¥wavdat¥DVD000010.002 | 2 |
| U000002 | DVD000010 | HDD001200 | C:¥wavdat¥DVD000010.005 | 5 |
| M000002 | DVD000230 | — | C:¥wavdat¥DVD000230.000 | 0 |
| U000003 | DVD000230 | HDD000150 | C:¥wavdat¥DVD000230.002 | 2 |
| U000004 | DVD000230 | HDD001200 | C:¥wavdat¥DVD000230.003 | 3 |
| ... | ... | ... | ... | ... |

| GROUP ID | COMBINATION NO. KNo | TITLE IDENTIFYING INFORMATION It | APPARATUS IDENTIFYING INFORMATION Iddrv | MEDIUM IDENTIFYING INFORMATION Iw | PHASE DIFFERENCE INFORMATION P |
|---|---|---|---|---|---|
| MG00001 | M000001 | DVD000010 | — | C:\wavdat\DVD000010.000 | 0 |
| UG00001 | U000001 | DVD000010 | HDD000150 | C:\wavdat\DVD000010.002 | 2 |
| UG00001 | U000002 | DVD000010 | HDD001030 | C:\wavdat\DVD000010.002 | 2 |
| UG00002 | U000003 | DVD000010 | HDD001200 | C:\wavdat\DVD000010.005 | 5 |
| MG00002 | M000002 | DVD000230 | — | C:\wavdat\DVD000230.000 | 0 |
| UG00003 | U000004 | DVD000230 | HDD000125 | C:\wavdat\DVD000230.002 | 2 |
| ... | ... | ... | ... | ... | ... |

FIG. 9

CONTENTS COPYING MANAGEMENT SYSTEM, COPYING MANAGEMENT DEVICE, COPYING MANAGEMENT METHOD, CONTENTS COPYING APPARATUS AND CONTENTS COPYING METHOD

BACKGROUND OF THE INVENTION

1. Field of the Invention

This invention relates to a contents copying management system that can suitably be applied, for instance, to recording/reproducing apparatus having a functional feature of reproducing the contents recorded on a DVD (digital versatile disc) or a CD (compact disc) (to be referred to as recorded contents hereinafter) and that of copying the recorded contents onto a hard disk.

2. Description of the Related Art

Recording/reproducing apparatus such as DVD-R (digital versatile disc—recordable) recorders and CD-R (compact disc—recordable) recorders adapted to copying various contents including image data and sound data onto a recording medium such as DVD-R or CD-R have been widely sold in recent years. Such recording/reproducing apparatus are intended to be used personally and provided with various measures for preventing illegal copying.

Popular techniques for preventing illegal copying include the color strip method, the AGC (automatic gain control) pulse method and the digital water mark method.

For instance, a replay-only DVD player using the color stripe method or the AGC pulse method is adapted to send out an output signal prepared by adding a pulse of a color burst signal and that of a vertical synchronous signal to the replay signal obtained by reproducing the recorded contents of a DVD to a DVD-R recorder for recording.

With this arrangement, it is impossible to correctly record the output signal by the DVD-R recorder because the added pulses degrade the quality of the reproduced image.

A DVD-R recorder that uses the digital watermark method is adapted to read a watermark of recorded contents carrying a pattern called the watermark and prohibit copying if the watermark says to do so.

Beside the above listed popular methods, a method as described below has also been proposed. A recording/reproducing apparatus using the proposed method stores a value that is specific to the apparatus in a nonvolatile memory and records the specific value on a recording medium with contents when copying the contents. When the recording/reproducing apparatus is operated to reproduce the contents that have been copied on the recording medium (to be referred to as copied contents hereinafter), the apparatus collates the specific value recorded on the recording medium and the specific value stored in the nonvolatile memory in the recording/reproducing apparatus itself and determines if the copied contents are allowed to be replayed only by the recording/reproducing apparatus or not on the basis of the outcome of the collation. If the apparatus determines that the copied contents have been illegally copied, it restricts any reproduction (see, inter alia, Japanese Patent Application Laid-Open Publication No. 2001-195826 (Column 3, FIG. 1).

If recorded contents of a DVD are copied on a writable DVD-RW for the purpose of personal use by means of a recording/reproducing apparatus using such a method, the copied contents can be replayed only by the recording/reproducing apparatus that has been used for recording the contents on the DVD-RW but cannot be replayed by any other recording/reproducing apparatus.

However, when the DVD is loaded on some other recording/reproducing apparatus, it is no longer possible for the recording/reproducing apparatus using the method to prevent the contents recorded on the DVD from being copied by the some other recording/reproducing apparatus.

For example, when a person borrows a DVD from an authorized user who purchased the DVD (to be referred to as authorized user hereinafter), the person who borrowed the DVD can copy the contents recorded on the DVD for the purpose of personal use by means of a recording/reproducing apparatus that the person owns. Then, if the person who borrowed the DVD copies the recorded contents only for the purpose of personal use, a third person who borrows the DVD carrying the copied contents from the owner of the DVD carrying the copied contents can recopy plural copied contents. Thus, it is consequently possible to make many illegal copies.

SUMMARY OF THE INVENTION

In view of the above-identified problem, it is therefore an object of the present invention to provide a contents copying management system that can reliably manage copying of contents recorded on DVDs and other popular recording mediums by preventing them from being illegally copied but allowing them to be copied only for the purpose of personal use.

According to the invention, the above object is achieved by providing a contents copying management system configured by connecting a contents copying apparatus and a copying management device by way of a network, the contents copying apparatus comprising: a medium identifying information acquiring means for acquiring medium identifying information specific to and characterizing a recorded-contents-carrying original recording medium; an apparatus identifying information acquiring means for acquiring apparatus identifying information specific to and indicating the contents copying apparatus itself; a copying-related combination information transmitting means for transmitting the medium identifying information and the apparatus identifying information to the copying management device as copying-related combination information at the time of copying the contents; a receiving means for receiving copying authorizing information generated by the copying management device on the basis of the copying-related combination information at the time of accessing the copying management device; and a control means for controlling the operation of copying the contents in response to the copying authorizing information;

the copying management device comprising: a memory means for registering and storing the copying-related combination information received from the contents copying apparatus in advance; a copying authorizing information generating means for comparing the copying-related combination information received at the time of access by the contents copying apparatus with the copying-related combination information registered in the memory means in advance, judging agreement or disagreement of the combinations of medium identifying information and apparatus identifying information, generating copying authorizing information for authorizing an operation of copying the contents in response to agreement of the combinations but generating copying non-authorizing information for not authorizing any operation of copying the contents in response to disagreement of the combinations; and a copying authorizing information transmitting means for transmitting the copying authorizing information to the contents copying apparatus.

Thus, the copying management device registers in advance the medium identifying information specific to and characterizing the recorded-contents-carrying original recording medium and the apparatus identifying information specific to and indicating the contents copying apparatus itself received from the contents copying apparatus as copying-related combination information that is to be used at the time of the operation of copying the contents of the contents copying apparatus and compares the copying-related combination information received from the contents copying apparatus when it is accessed by the contents copying apparatus and the copying-related combination information registered in it in advance so that it transmits copying authorizing information to the contents copying apparatus only when they agree with each other. In this way, the copying management device can manage any operation of copying the contents of a recorded-contents-carrying original recording medium by the contents copying apparatus with respect to each recorded-contents-carrying original recording medium.

According to the invention, the copying management device may receives by way of a network the medium identifying information specific to and characterizing the recorded-contents-carrying original recording medium and the apparatus identifying information specific to and indicating the contents copying apparatus itself from the contents copying apparatus as copying-related combination information that is to be used at the time of the operation of copying the contents of the contents copying apparatus, registers and stores in advance the copying-related combination information received from the contents copying apparatus, compares the copying-related combination information received from the contents copying apparatus when it is accessed by the contents copying apparatus and the copying-related combination information registered in it in advance and determines if the combinations of medium identifying information and apparatus identifying information agree with each other or not so that it generates copying authorizing information only when they agree with each other but generates copying non-authorizing information when they do not agree with each other and transmits the copying authorizing information or copying non-authorizing information to the contents copying apparatus. In this way, the copying management device manages any operation of copying the contents of a recorded-contents-carrying original recording medium by the contents copying apparatus according to the copying authorizing information with respect to each recorded-contents-carrying original recording medium.

Thus, the copying management device registers in advance the medium identifying information specific to and characterizing the recorded-contents-carrying original recording medium and the apparatus identifying information specific to and indicating the contents copying apparatus itself received from the contents copying apparatus as copying-related combination information that is to be used at the time of the operation of copying the contents by the contents copying apparatus and compares the copying-related combination information received from the contents copying apparatus when it is accessed by the contents copying apparatus and the copying-related combination information registered in it in advance so that it transmits copying authorizing information to the contents copying apparatus only when they agree with each other. In this way, the copying management device can manage any operation of copying the contents of a recorded-contents-carrying original recording medium by the contents copying apparatus with respect to each recorded-contents-carrying original recording medium.

Further, in the present invention, copying is controlled according to the copying authorizing information by acquiring medium identifying information specific to and characterizing the recorded-contents-carrying original recording medium and apparatus identifying information specific to and indicating the contents copying apparatus itself, transmitting the medium identifying information and the apparatus identifying information to the copying management device by way of a network as copying-related combination information that is to be used at the time of the operation of copying the contents, registering in advance the copying-related combination information by the copying management device, and comparing the copying-related combination information transmitted at the time of accessing to the copying management device with the copying-related combination information registered in advance by the copying management device, then authorizing an operation of copying the contents in response to agreement of the combinations of medium identifying information and apparatus identifying information but not authorizing any operation of copying the contents in response to disagreement of the combinations of medium identifying information and apparatus identifying information from the copying management device.

Thus, any operation of copying the contents of a recorded-contents-carrying original recording medium can be managed by the copying management device with respect to each recorded-contents-carrying original recording medium by acquiring the medium identifying information specific to and characterizing the recorded-contents-carrying original recording medium and the apparatus identifying information specific to and indicating the contents copying apparatus itself, transmitting the medium identifying information and the apparatus identifying information to the copying management device by way of a network as copying-related combination information that is to be used at the time of the operation of copying the contents, registering in advance the copying-related combination information by the copying management device, and comparing the copying-related combination information transmitted at the time of accessing to the copying management device with the copying-related combination information registered in advance by the copying management device, then receiving copying authorizing information generated in such a way that an operation of copying the contents is authorized only when the combinations of medium identifying information and apparatus identifying information agree with each other from the copying management device, and controlling the operation of copying according to the copying authorizing information.

As described above, according to the invention, the copying management device registers in advance the medium identifying information specific to and characterizing the original recording medium carrying recorded contents and the apparatus identifying information specific to and indicating the contents copying apparatus itself received from the contents copying apparatus as copying-related combination information that is to be used at the time of the operation of copying the contents of the contents copying apparatus and compares the copying-related combination information received from the contents copying apparatus when it is accessed by the contents copying apparatus and the copying-related combination information registered in it in advance so that it transmits copying authorizing information to the contents copying apparatus only when they agree with each other. In this way, the copying management device can control any operation of copying the contents of an original recording medium by the contents copying apparatus. Thus, it is now possible to establish a contents copying management system that can reliably control any operation of copying the recorded contents of an original recording medium such as DVD that is currently very popular so as to prevent any illegal copying and authorize an operation of copying the contents only for the purpose of personal use.

Furthermore, according to the invention, the contents copying apparatus acquires the medium identifying information specific to and characterizing the original recording medium carrying recorded contents and the apparatus identifying information specific to and indicating the contents copying apparatus itself and transmits the medium identifying information and the apparatus identifying information to the copying management system by way of a communication network as copying-related combination information that is to be used at the time of the operation of copying the contents. After the copying-related combination information is registered by the copying management system, the copying-related combination information that is transmitted to the copying management system when the contents copying apparatus accesses the copying management system and the copying-related combination information registered in advance are compared by the copying management system and the contents copying apparatus receives copying authorizing information generated by the copying management system in such a way that an operation of copying the contents is authorized when the combinations of memory identifying information and apparatus identifying information agree with each other whereas any operation of copying the contents is not authorized when the combinations of memory identifying information and apparatus identifying information do not agree with each other. In this way, the contents copying apparatus is controlled according to the copying authorizing information and any operation of copying the contents of an original recording medium is controlled by the copying management system. Thus, again, it is now possible to establish a copying management system and a copying control method that can reliably control any operation of copying the recorded contents of an original recording medium such as DVD that is currently very popular so as to prevent any illegal copying and authorize an operation of copying the contents only for the purpose of personal use.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 6A and 6B are schematic illustrations of the contents of an identifying information database;

FIG. 9 is a schematic illustration of the contents of an identifying information database that can be used to conduct a group management in another embodiment.

DETAILED DESCRIPTION OF THE INVENTION

Now, an embodiment of the present invention will be described in greater detail by referring to the accompanying drawings.

(1) Overall Configuration of the Contents Copying Management System

Figure 1:
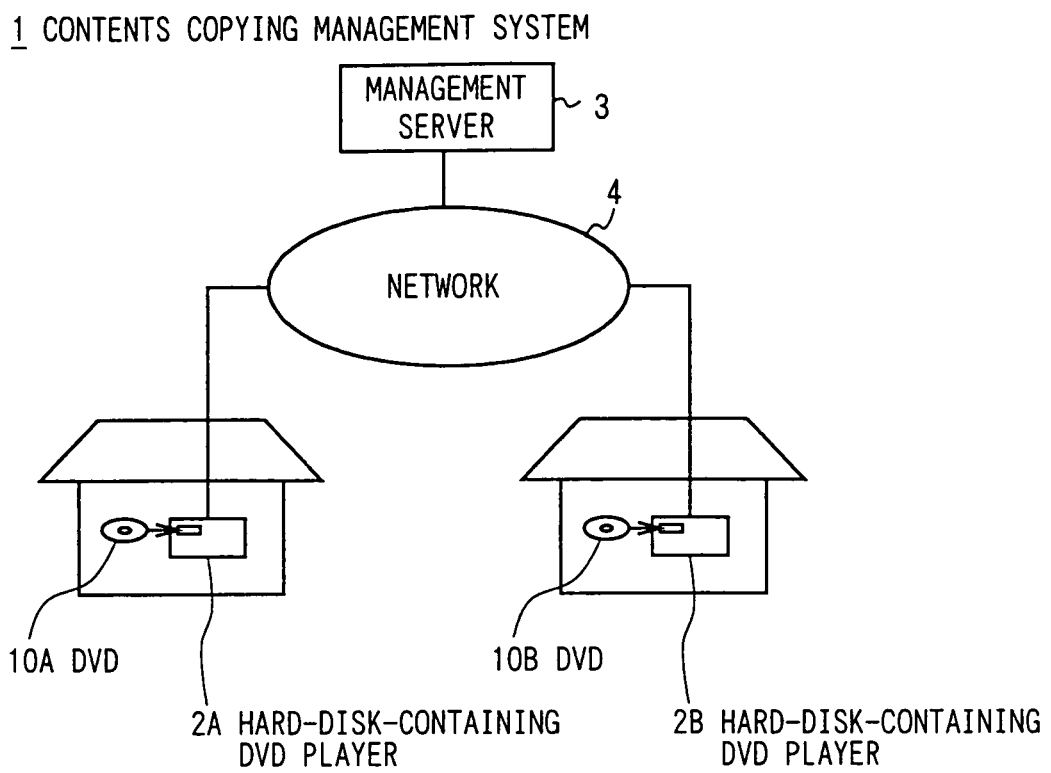
FIG. 1 is a schematic illustration of an embodiment of contents copying management system according to the invention, showing the entire configuration thereof.

Referring to FIG. 1, reference numeral 1 denotes a contents copying management system according to the invention which comprises DVD players 2A and 2B that are arranged in respective homes and contain respective hard disks and a management server 3 connected to the DVD players 2A and 2B containing the respective hard disks by way of a communication network 4, which may typically be the Internet.

The hard-disk-containing DVD players 2A, 2B are adapted to replay DVDs 10A, 10B that are loaded on the respective DVD players 2A, 2B and copy the recorded contents to the respective hard disks. Additionally, the contents that are copied to the hard disks can be reproduced.

On the other hand, the management server 3 manages operations of copying the DVDs 10A, 10B by means of the hard-disk-containing DVD players 2A, 2B.

Now, the circuit configuration of the hard-disk-containing DVD player 2A will be described in terms of contents reproduction mode for reproducing the recorded contents of the DVD 10A, contents copying mode for copying the recorded contents onto the hard disk and copied contents reproduction mode for reproducing the contents copied onto the hard disk.

Since the hard-disk-containing DVD player 2B has a circuit configuration exactly same as that of the hard-disk-containing DVD player 2A, only the hard-disk-containing DVD player 2A will be described here.

(2) Contents Reproduction Mode

Figure 2:
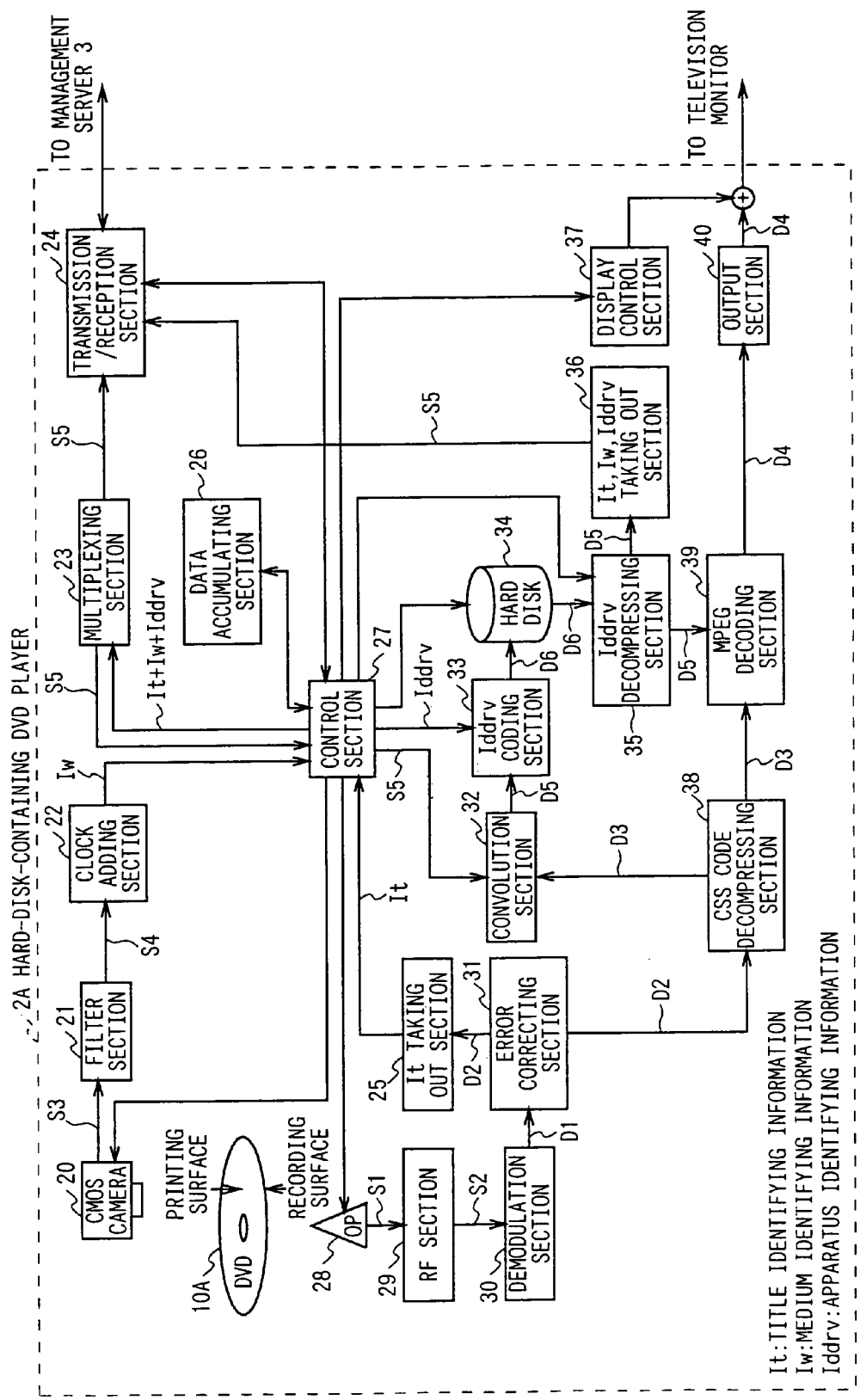
FIG. 2 is a schematic block diagram of a DVD player containing a hard disk, illustrating its circuit configuration.

As shown in FIG. 2, the hard-disk-containing DVD player 2A of the contents copying management system 1 is so designed that control section 27 that comprises a CPU (central processing unit) comprehensively controls the entire player. The hard-disk-containing DVD player 2A operates to reproduce the contents recorded on the DVD 10A in a contents reproduction mode under the control of the control section 27 in a manner as described below.

OP (optical pickup) 28 obtains read signal S1 by reading the recording surface of the DVD 10A and transmits the obtained signal to RF section 29. The RF section 29 by turn obtains corrected signal S2 by correcting the frequency characteristics of the read signal S1 and transmits it to demodulation section 30.

The demodulation section 30 obtains demodulated data D1 by demodulating the corrected signal S2 according to the DVD format and transmits the data to an error correcting section 31. The error correcting section 31 obtains reproduction data D2 by carrying out an error correcting process on the demodulated data D1 and transmits the obtained data to CSS code decompressing section 38.

The recorded contents of ordinary DVDs are mostly encoded by means of a CSS (contents scramble system) in order to prohibit copying. When the reproduction data D2 is encoded by means of a CSS, the CSS code decompressing section 38 obtains CSS decompressed data D3 by decompressing the CSS code of the reproduction data D2 and transmits the obtained data to MPEG (Moving Picture Expert Group) decoding section 39.

The MPEG decoding section 39 obtains video data D4 by decoding the CSS decompressed data D3 and transmits the obtained data to output section 40. The output section 40 is adapted to output the video data D4 to a display means, which is typically a television monitor (not shown).

The recorded contents of the DVD 10A are reproduced in a contents reproduction mode by the hard-disk-containing DVD player 2A of the contents copying management system 1 in the above described manner.

(3) Contents Copying Mode

Figure 3:
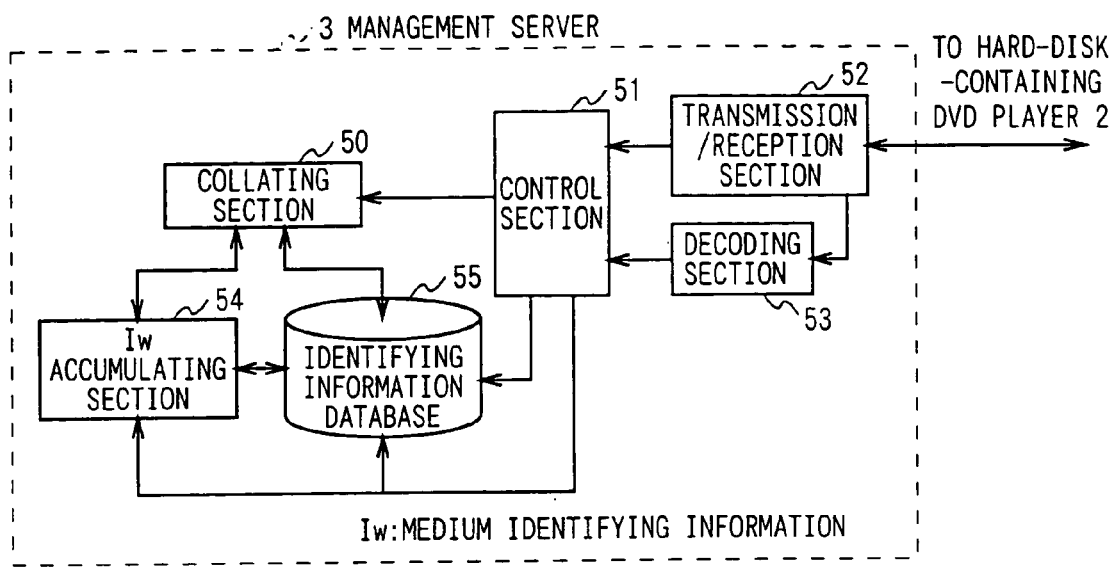
FIG. 3 is a schematic block diagram of the management server, illustrating its circuit configuration.

Now, an operation of the hard-disk-containing DVD player 2A of the contents copying management system 1 for copying the recorded contents of the DVD 10A onto the hard disk in a contents copying mode will be described by referring to the circuit diagrams of FIGS. 2 and 3 and the flow charts of FIGS. 4 and 5.

Note that it is assumed here that the copying processing method as described below is adopted for the recorded contents of the DVD 10A and the recorded contents of the DVD 10A are allowed to be copied by the hard-disk-containing DVD player 2A and designed to prevent pirating and revising only for the purpose of personal use. It is also assumed here that the recorded contents of the DVD 10A are not allowed to be copied by the hard-disk-containing DVD player 2B even for the purpose of personal use.

In a contents copying mode, there are two processes including a process to be carried out by the hard-disk-containing DVD player and a copying management process to be carried out by the management server. Firstly, the process to be carried out by the hard-disk-containing DVD player for copying the recorded contents will be discussed below.

Figure 4:
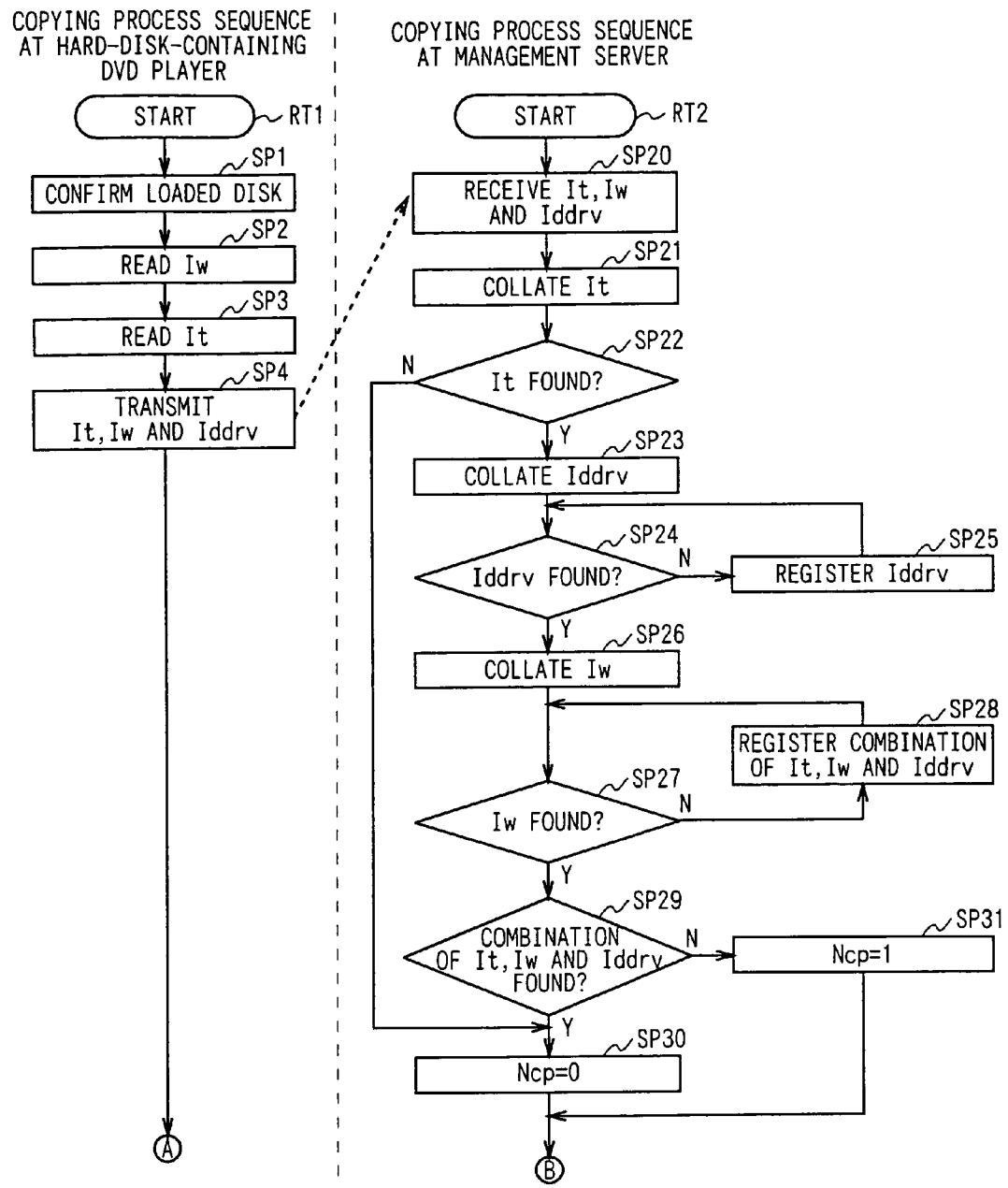
FIG. 4 is a flow chart illustrating the sequence of a process for copying the recorded contents of a DVD.

Referring to FIG. 4, for the process of the hard-disk-containing DVD player for copying the recorded contents, the control section 2.7 of the hard-disk-containing DVD player 2A starts Routine RT1 and moves to Step SP1.

In Step SP1, the control section 27 of the hard-disk-containing DVD player 2A confirms that the DVD 10A has been loaded and drives the DVD 10A to rotate at a constant rate, then the control section 27 moves to Step SP2.

In Step SP2, the control section 27 of the hard-disk-containing DVD player 2A picks up an image of the pattern printed on the printing surface of the DVD 10A by means of a CMOS (complementary metal oxide semiconductor) camera 20 whose angle relative to OP 28 is predefined and rigidly secured in synchronism with the clock read out from the recording surface of the DVD 10A by means of the OP 28. At this time, the operation of the control section 27 of the hard-disk-containing DVD player 2A for picking up an image from the printing surface is triggered by the synchronizing signal of the data block existing in the specific physical address recorded on the recording surface and terminates when a predetermined time period has elapsed. The luminance signal S3 for the predetermined time period obtained as a result of the image picking up operation is then transmitted to filter section 21.

The control section 27 of the hard-disk-containing DVD player 2A obtains medium identifying signal S4 by removing the noise of the luminance signal S3 by means of the filter section 21 and transmits the obtained signal to clock adding section 22. The control section 27 of the hard-disk-containing DVD player 2A obtains medium identifying signal waveform Iw for a full turn of the DVD 10A out of the medium identifying signal S4 for the predetermined time period by defining the correspondence of the medium identifying signal S4 to the clock for a full turn of the DVD 10A by means of the clock adding section 22 and moves to the next step, or Step SP3.

Since the printing surface and the recording surface of a DVD are molded separately in the ordinary manufacturing process, their positional relationship differs from a DVD to another. Therefore, the medium identifying signal waveform Iw that is obtained by starting an operation of picking up an image of the printing surface, using the synchronizing signal of the data block existing in the specific physical address recorded on the recording surface as trigger, represents the positional relationship between the printing surface and the recording surface of the DVD and their positional relationship can be used as medium identifying information that is specific to the DVD.

In this way, the control section 27 of the hard-disk-containing DVD player 2A can identify each and every DVD and therefore it identifies the DVD 10A by taking out the medium identifying information Iw that is specific to the medium identifying information Iw.

In Step SP3, the control section 27 of the hard-disk-containing DVD player 2A obtains read signal S1 by reading the recording surface of the DVD 10A by means of the OP 28 as in the case of contents reproduction mode and transmits it to the RF section 29.

The control section 27 of the hard-disk-containing DVD player 2A obtains reproduction data D2 by carrying out the above described process for the read signal S1 respectively in the RF section 29, the demodulation section 30 and an error correcting section 31 and transmits it to It taking out section 25 and also to the CSS code decompressing section 38, which CSS code decompressing section 38 by turn carries out a predetermined process on the reproduction data D2 to obtain CSS decompressed data D3 and transmits it to convolution section 32.

The control section 27 of the hard-disk-containing DVD player 2A drives the It taking out section 25 to take out title identifying information It recorded in the lead-in area and the TOC (table of contents) of the DVD 10A from the reproduction data D2 and then moves to Step SP4.

In Step SP4, the control section 27 of the hard-disk-containing DVD 2A reads out apparatus identifying information Iddrv defined for and specific to the hard-disk-containing DVD player 2A from data accumulating section 26 comprising a nonvolatile memory and the like and transmits the obtained apparatus identifying information Iddrv to multiplexing section 23 along with the medium identifying information Iw obtained in Step SP2 and the title identifying information It obtained in Step SP3.

The control section 27 of the hard-disk-containing DVD player 2A obtains multiplexed signal S5 by driving the multiplexing section 23 to multiplex the title identifying information It, the medium identifying information Iw and the apparatus identifying information Iddrv and transmits it to transmission/reception section 24 and also to the convolution section 32.

Figure 5:
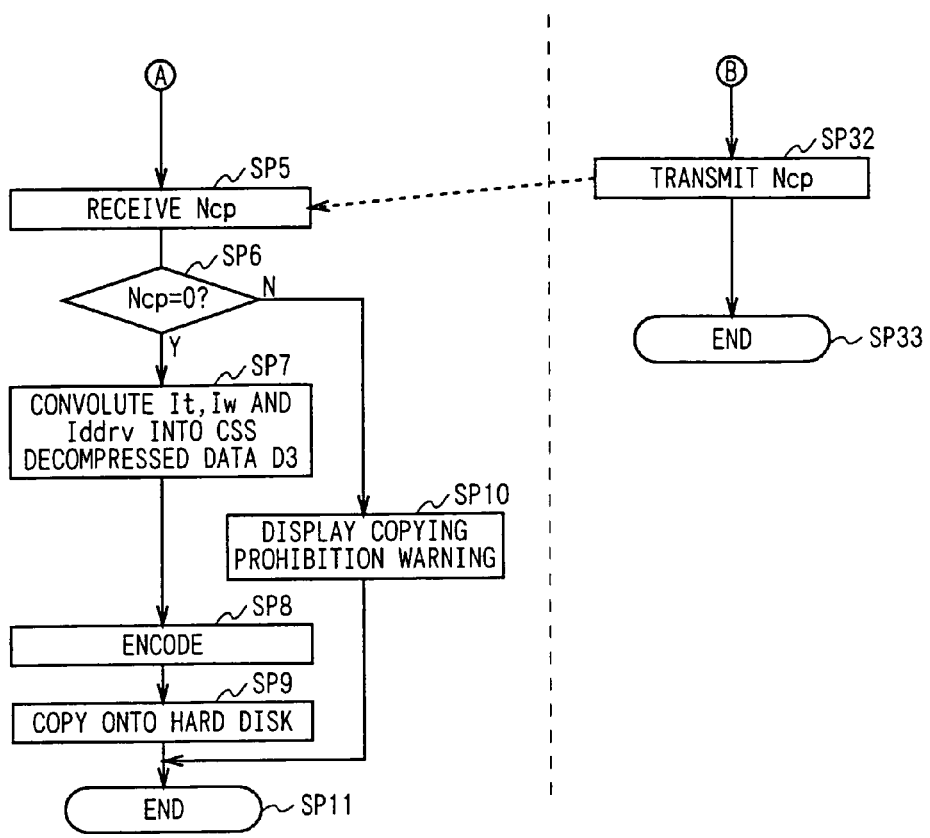
FIG. 5 is a flow chart illustrating the sequence of a process for copying the recorded contents of a DVD that comes after the sequence of FIG. 4.

The control section 27 of the hard-disk-containing DVD player 2A drives the transmission/reception section 24 to carry out a predetermined process for the multiplexed signal S5 necessary for transmitting it and subsequently transmits it to the management server 3 before it moves to the next Step SP5 (FIG. 5). The communication path between the hard-disk-containing DVD player 2A and the management server 3 is preferably a safe communication path such as VPN (virtual private network).

Thus, it is so arranged that the control section 27 of the hard-disk-containing DVD player 2A notifies the management server 3 that the contents of the DVD 10A are going to be copied by the hard-disk-containing DVD player 2A by transmitting the medium identifying information Iw and the title identifying information It of the DVD 10A and the apparatus identifying information Iddrv of the hard-disk-containing DVD player 2A to the management server 3.

Now, the processing operation moves to a copying management process that is conducted at the management server. As shown in FIG. 3, the control section 51 of the management server 3 that comprises a CPU comprehensively controls entire processing operation. It stores the data on the identifying information that are necessary for identifying the DVDs 10A, 10B and the hard-disk-containing DVD players 2A, 2B as will be described hereinafter in identifying information database 55 so that it can manage them.

FIGS. 6A and 6B illustrate the contents of the identifying information database 55. Referring to 6A and 6B, the identifying information database 55 stores each combination number KNo, the corresponding title identifying information It of the DVD, the apparatus identifying information Iddrv of the hard-disk-containing DVD player that is used to copy the contents of the DVD, the medium identifying information Iw of the DVD and the phase difference information P (which will be described hereinafter) as a single identifying information data.

The combination number KNo is a number specifically assigned to the corresponding identifying information data so as to be used to manage the related combination of the title identifying information It of the DVD, the apparatus identifying information Iddrv of the hard-disk-containing DVD player, the medium identifying information Iw and the phase difference information P. In the following description, the identifying information data whose combination number KNo is "M000001" is also referred to as identifying information data "M000001".

The waveform signal of the medium identifying information Iw is stored in Iw accumulating section 54, which comprises a hard disk or the like, and the file name of the file storing the waveform signal of the medium identifying information Iw is stored in the identifying information database 55.

Referring to FIG. 6A, to operate the contents copying management system 1, it is necessary to previously register in the identifying information database 55 the identifying information data "M000001", "M000002" and so on, each containing the title identifying information It of the DVD whose contents need to be prevented by a manager of the management server 3 from being illegally copied, before the corresponding DVDs are released for sale and/or rental. Additionally, if they are registered after being released for sale, their contents are prevented from being illegally copied after the registration.

Note that the identifying information data "M000001" includes a combination of the title identifying information It "DVD000010" of the DVD whose contents need to be prevented and the medium identifying information Iw "C:¥wavdat¥DVD000010. 000" of the corresponding DVD and is referred to as reference identifying information data "M00001" hereinafter, whereas the medium identifying information Iw of the reference identifying information data "M000001" is referred to as reference waveform Iw hereinafter.

This means that the management server 3 recognizes that the DVDs for which the reference identifying information data "M000001" and the reference identifying information data "M000002" respectively having the title identifying information It "DVD00000" and the title identifying information "DVD000230" are registered in the identifying information database 55 are those whose contents need to be prevented from being copied, whereas the management server 3 recognizes that the DVDs for which the reference identifying information data having the title identifying information It are not registered in the identifying information database 55 are those whose contents may be freely copied.

Referring to FIG. 6B, when the hard-disk-containing DVD players 2A, 2B of the contents copying management system 1 are used to copy the contents of the DVDs 10A, 10B for the purpose of personal use, identifying information data "U000001", "U000002, "U000003" and "U000004" are registered in the identifying information database 55.

The identifying information data "U000001" includes the title identifying information It "DVD0000010" of the DVD 10A whose contents are copied, the apparatus identifying information "HDD000150" of the hard-disk-containing DVD player 2A that is used to copy the contents of the DVD 11A, the medium identifying information Iw "C:¥wavdat¥DVD000010. 002" of the DVD 10A, and the phase difference information P"2" (which will be described hereinafter) on the phase difference between the reference waveform Iw "C: ¥wavdat¥DVD000010. 000" of the reference identifying information data "M000001", and the medium identifying information Iw "C: ¥wavdat¥DVD000010.020". This identifying information data is referred to as user identifying information data "U000001" hereinafter.

Thus, the identifying information database 55 accumulates the reference identifying information data "M000001", "M000002", . . . and the user identifying information data "U000001", U000002", . . . . With this arrangement, it is possible for the management server 3 to control the DVDs whose contents need to be prevented from being copied and any operation of copying the contents of any of the DVDs by means of one of the hard-disk-containing DVD players.

For the copying management process at the management server, the control section 51 of the management server 3 starts Routine RT2 (FIG. 4) and moves to Step SP20. In Step SP20, the control section 51 of the management server 3 receives the multiplexed signal S5 transmitted from the hard-disk-containing DVD player 2A in Step SP4 by means of transmission/reception section 52 and carries out a predetermined reception process for the received signal. Then, it drives the decoding section 53 to decode the signal in order to obtain the title identifying information It and the medium identifying information Iw of the DVD 10A and the apparatus identifying information Iddrv of the hard-disk-containing DVD player 2A and then moves to the next Step SP21.

Assume here that the title identifying information It of the DVD 10A is "DVD000010" and the apparatus identifying information Iddrv of the hard-disk-containing DVD player 2A is "HDD000150", for the following description. Note, however, that no code is used for the medium identifying information Iw because it is the waveform signal itself transmitted from the hard-disk-containing DVD player 2A.

In Step SP21, the control section 51 of the management server 3 drives collating section 50 to collate the title identifying information It "DVD000010" of the DVD 10A and the title identifying information It in the reference identifying information data "M000001", "M000002", . . . accumulated in the identifying information database 55 and subsequently moves to the next Step SP22.

In Step SP22, the control section 51 of the management server 3 judges if the title identifying information It "DVD000010" of the DVD 10A is found in one of the reference identifying information data "M000001", "M000002", . . . of the identifying information database 55 or not according to the result of the collation in Step SP21.

If the result of the above judgment is negative, the control section 51 of the management server 3 determines that the title identifying information It "DVD000010" of the DVD 10A does not exist in any of the reference identifying information data "M000001", "M000002", . . . of the identifying information database 55 and hence the recorded contents of the DVD 10A may be copied freely and then moves to Step SP30.

In Step SP30, the control section 51 of the management server 3 selects "0" for copying prohibition flag Ncp and then moves to Step SP32 (FIG. 5). Note that "0" is selected for the copying prohibition flag Ncp when it is allowed to copy the recorded contents of the DVD 10A, whereas "1" is selected for the copying prohibition flag Ncp when it is prohibited to copy the recorded contents of the DVD 10A.

In Step SP32, the control section 51 of the management server 3 drives the transmission/reception section 52 to carry out a predetermined transmission process for the copying prohibition flag Ncp and subsequently transmits it to the hard-disk-containing DVD player 2A and then moves to the next Step SP33.

Thus, if no reference identifying information data having title identifying information It "DVD000010" of the DVD 10A is registered in the identifying information database 55, the control section 51 of the management server 3 skips the collation process for the medium identifying information Iw of the DVD 10A and the apparatus identifying information Iddrv "HDD000150" of the hard-disk-containing DVD player 2A (from Step SP23 to Step SP29) and transmits the copying prohibition flag Ncp indicating that it is allowed to copy the recorded contents of the DVD 10A to the hard-disk-containing DVD player 2A so as to simplify the copying management process at the management server 3.

If, on the other hand, the result of the judgment in Step SP22 (FIG. 4) is positive, the control section 51 of the management server 3 determines that the title identifying information It "DVD0000010" of the DVD 10A exists in one of the reference identifying information data "M000001", "M000002", . . . of the identifying information database 55 and hence it is prohibited to illegally copy the recorded contents of the DVD 10A. In this case, the control section 51 of the management server 3 moves to the next Step SP23.

In Step SP23, the control section 51 of the management server 3 drives the collating section 50 to collate the apparatus identifying information Iddrv "HDD000150" of the hard-disk-containing DVD player 2A and the apparatus identifying information Iddrv accumulated in the identifying information database 55 and then moves to the next Step SP24.

In Step SP24, the control section 51 of the management server 3 judges if the apparatus identifying information Iddrv of the hard-disk-containing DVD player 2A is found in the identifying information database 55 or not according to the result of the collation in Step SP23.

If the result of the above judgment is negative, it means that the apparatus identifying information Iddrv "HDD000150" of the hard-disk-containing DVD player 2A has not been registered in the identifying information database 55 by the control section 51 of the management server 3 and hence the hard-disk-containing DVD player 2A will carry out a copying process of copying the recorded contents of the DVD 10A onto the hard disk 34 from now for the first time. In this case, the control section 51 of the management server 3 moves to the next Step SP25.

In Step SP25, the control section 51 of the management server 3 registers the apparatus identifying information Iddrv of the hard-disk-containing DVD player 2A in the identifying information database 55 and then moves to Step SP24.

If, on the other hand, the result of the above judgment in Step SP24 is positive, it means that the apparatus identifying information Iddrv "HDD000150" of the hard-disk-containing DVD player 2A has been registered in the identifying information database 55 by the control section 51 of the management server 3. In this case, the control section 51 of the management server 3 moves to Step SP26.

In Step SP26, the control section 51 of the management server 3 drives the collating section 50 to collate the medium identifying information Iw of the DVD 10A and the medium identifying information Iw accumulated in the Iw accumulating section 54 and subsequently moves to Step SP27.

Since the medium identifying information Iw is a waveform signal per se and it is time consuming to collate the medium identifying information Iw of the DVD 10A with all the medium identifying information Iw accumulated in the Iw accumulating section 54, the control section 51 of the management server 3 instead detects the phase difference by comparing, for instance, the reference waveform Iw "C: ¥wavdat¥DVD000010. 000" of the reference identifying information data "M000001" that has title identifying information It "DVD000010" same as the title identifying information It "DVD000010" of the DVD 10A and the medium identifying information Iw of the DVD 10A and collates the phase difference obtained as a result of the detecting operation with the phase difference information P of the user identifying information data "U000001" and "U000002", having title identifying information It "DVD000010" same as the title identifying information It "DVD000010" of the DVD 10A.

Firstly, the control section 51 of the management server 3 drives the collating section 50 to retrieve, for instance, the reference identifying information data "M000001" having title identifying information It "DVD000010" same as the title identifying information It "DVD000010" out of the reference identifying information data "M000001", "M000002", . . . stored in the identifying information database 55 and defines the correlation between the reference waveform Iw "C: ¥wavdat¥DVD000010. 000" of the reference identifying information data "M000001" and the medium identifying information Iw of the DVD 10A. The control section 51 of the management server 3 may typically use SPOMF (symmetric phase-only matched filtering) as technique for defining the correlation.

Then, the control section 51 of the management server 3 detects the phase difference between the reference waveform Iw "C: ¥wavdat¥DVD000010. 000" of the reference identifying information data "M00001" and the medium identifying information Iw of the DVD 10A at the time of defining the correlation and uses the phase difference as phase difference information P of the DVD 10A.

Assume here, as an example, that a phase difference of "2" is obtained as a result of the detecting operation and hence the phase difference information P of the DVD 10A is "2".

Then, the control section 51 of the management server 3 retrieves, for instance, the user identifying information data "U000001", "U000002" having title identifying information It "DVD000010" same as the title identifying information It "DVD000010" of the DVD 10A out of the user identifying information data "U000001", "U000002", . . . and collates the phase difference information P "2" in the user identifying information data "U000001", "U000002" with the phase difference information P of the user identifying information data.

Note that the phase difference information P indicates the discrepancy of the medium identifying information Iw of the DVD 10A from the reference waveform Iw "C:

¥wavdat¥DVD000010. 000" of the reference identifying information data "M000001" having title identifying information It "DVD000010" that is same as the title identifying information It "DVD000010" of the DVD 10A.

In other words, since the user identifying information "U000001" that has title identifying information It "DVD000010" same as the title identifying information It "DVD000010" of the DVD 10A and phase difference information P "2" same as the phase difference information P "2" of the DVD 10A also has medium identifying information Iw same as that of the DVD 10A, it is safe to say that the user identifying information "U000001" is the one that is registered in the identifying information database 55 when the contents of the DVD 10A were copied.

This will be described further by referring to FIGS. 6A and 6B. The control section 51 of the management server 3 retrieves, for instance, the reference identifying information data "M000001" having title identifying information It "DVD000010" same as the title identifying information It "DVD000010" of the DVD 10A from the identifying information database 55 and detects the phase difference between the reference waveform Iw "C: ¥wavdat¥DVD000010. 000" of the reference identifying information data "M000001" and the medium identifying information Iw of the DVD 10A.

If the phase difference is found to be equal to "2" from the outcome of the detecting, the control section 51 of the management server 3 can judge that the DVD 10A has phase difference information P "2".

Then, the control section 51 of the management server 3 detects the user identifying information data "U000001" having the title identifying information It "DVD000010" and the phase difference information P "2" from the identifying information database 55.

In this way, the control section 51 of the management server 3 can obtain a result same as the one obtained by collating the medium identifying information Iw of the DVD 10A with all the medium identifying information Iw accumulated in the identifying information database 55 in a remarkably curtailed period of time by comparing the value of the phase difference information P obtained as a result of collating, for instance, the reference waveform Iw "C: ¥wavdat¥DVD000010. 000" of the reference identifying information data "M000001" having title identifying information It "DVD000010" same as the title identifying information It "DVD000010" of the DVD 10A with the medium identifying information Iw of the DVD 10A with the value of the phase difference information P, for instance, of the user identifying information data "U000001", "U000002" having title identifying information It "DVD000010" same as the title identifying information It "DVD000010" of the DVD 10A.

In Step SP27, the control section 51 of the management server 3 judges if the medium identifying information Iw of the DVD 10A is found in the identifying information database 55 or not on the basis of the outcome of the collation in Step SP26. More specifically, the control section 51 of the management server 3 judges if a user identifying information data having title identifying information It "DVD000010" and phase difference information P "2" same as the title identifying information It "DVD000010" and the phase difference information P "2" of the DVD 10A is found in the identifying information database 55 or not.

If the result of the above judgment is negative, it means that the medium identifying information Iw of the DVD 10A has not been registered in the identifying information database 55 by the control section 51 of the management server 3. In this case, the control section 51 of the management server 3 moves to Step SP28.

In Step SP28, the control section 51 of the management server 3 registers the combination number KNo "U0000001", the title identifying information It "DVD000010" and the medium identifying information Iw "C: ¥wavdat¥DVD000010. 002" of the DVD 10A, the apparatus identifying information Iddrv "HDD000150" of the hard-disk-containing DVD player 2A and the phase difference information P "2" obtained in Step SP26 as a single user identifying information data "U000001" in the identifying information database 55 and moves to Step SP27.

In this way, if the recorded contents of the DVD 10A have never been copied before, the control section 51 of the management server 3 registers, for instance, the user identifying information data "U000001" in the identifying information database 55 to indicate that the recorded contents of the DVD 10A are now copied by the hard-disk-containing DVD player 2A. Thus, thereafter, the control section 51 of the management server 3 can recognize that the recorded contents of the DVD 10A are allowed to be copied only by the hard-disk-containing DVD player 2A since.

If, on the other hand, the result of the above judgment in Step SP27 is positive, it means that the medium identifying information Iw of the DVD 10A has been registered in the identifying information database 55 by the control section 51 of the management server 3. In this case, the control section 51 of the management server 3 moves to Step SP29.

In Step SP29, the control section 51 of the management server 3 judges if a user identifying information data having a combination same as that of the title identifying information It "DVD000010", and the medium identifying information Iw of the DVD 10A and the apparatus identifying information Iddrv "HDD000150" of the hard-disk-containing DVD player 2A is found in the identifying information database 55 or not.

If the result of the above judgment is positive, it means that, for instance, the user identifying information data "U000001" having a combination same as that of the title identifying information It "DVD000010" and the medium identifying information Iw of the DVD 10A and the apparatus identifying information Iddrv "HDD000150" of the hard-disk-containing DVD player 2A has been registered in the identifying information database 55 by the control section 51 of the management server 3 and hence the recorded contents of the DVD 10A are allowed to be copied by an authorized user by means of the hard-disk-containing DVD player 2A only for the purpose of personal use. In this case, the control section 51 of the management server 3 moves to Step SP30.

In Step SP30, the control section 51 of the management server 3 selects "0" for copying prohibition flag Ncp and then moves to Step SP32 (FIG. 5).

If, on the other hand, the result of the above judgment in Step SP29 (FIG. 4) is negative, it means that the user identifying information data having a combination same as that of the title identifying information It "DVD000010" and the medium identifying information Iw of the DVD 10A and the apparatus identifying information Iddrv "HDD000150" of the hard-disk-containing DVD player 2A has not been registered in the identifying information database 55 and hence the recorded contents of the DVD 10A are prohibited from being copied by the hard-disk-containing DVD player 2A. In this case, the control section 51 of the management server 3 moves to Step SP31.

This will be described further by referring to FIGS. 6A and 6B. The control section 51 of the management server 3 retrieves a user identifying information data having a combination same as that of the title identifying information It "DVD000010" and the phase difference information P "2" of the DVD 10A and the apparatus identifying information Iddrv "HDD000150" of the hard-disk-containing DVD player 2A from the identifying information database 55.

If the control section 51 of the management server 3 judges as a result of the retrieving operation that a user identifying information data having a combination same as that of the title identifying information It "DVD000010" and the phase difference information P "2" and the apparatus identifying information Iddrv "HDD000150" is not found in the identifying information database 55, it means that the control section 51 of the management server 3 recognizes that the recorded contents of the DVD 10A have already been copied by a hard-disk-containing DVD player other than the hard-disk-containing DVD player 2A, which may be the hard-disk-containing DVD player 2B.

In Step SP31, the control section 51 of the management server 3 selects "1" for the copying prohibition flag Ncp and then moves to the next Step SP32 (FIG. 5).

In Step SP32, the control section 51 of the management server 3 drives the transmission/reception section 52 to carry out a predetermined process for the copying prohibition flag Ncp and subsequently transmit it to the hard-disk-containing DVD player 2A. Thereafter, it moves to the next Step SP33 to terminate the copying management process of the management server.

In this way, the control section 51 of the management server 3 collates the title identifying information It "DVD000010" and the medium identifying information Iw of the DVD 10A and the apparatus identifying information Iddrv "HDD000150" of the hard-disk-containing DVD player 2A transmitted from the hard-disk-containing DVD player 2A and the combination thereof with the data in the identifying information database 55 and judges if the recorded contents of the DVD 10A are authorized to be copied by means of the hard-disk-containing DVD player 2A or not on the basis of the result of the collation.

If, as a result, it is judged that the recorded contents of the DVD 10A are authorized to be copied, it transmits a copying prohibition flag Ncp "0" to the hard-disk-containing DVD player 2A. If, on the other hand, it is judged that the recorded contents of the DVD 10A are prohibited from being copied, it transmits a copying prohibition flag Ncp "1" to the hard-disk-containing DVD player 2A.

Now, the processing operation returns to the copying management process that is conducted at the hard-disk-containing DVD player. In Step SP5 (FIG. 5), the control section 27 of the hard-disk-containing DVD player 2A receives at the transmission/reception section 24 the copying prohibition flag Ncp transmitted from the management server 3 in Step SP32 and then moves to the next Step SP6.

In Step SP6, the control section 27 of the hard-disk-containing DVD player 2A judges if the copying prohibition flag Ncp is "0" or not.

If the result of the above judgment is negative, it means that the copying prohibition flag Ncp is "1" and hence the recorded contents of the DVD 10A are prohibited from being copied by the hard-disk-containing DVD player 2A. In this case, the control section 27 of the hard-disk-containing DVD player 2A moves to the next Step SP10.

Figure 7A:
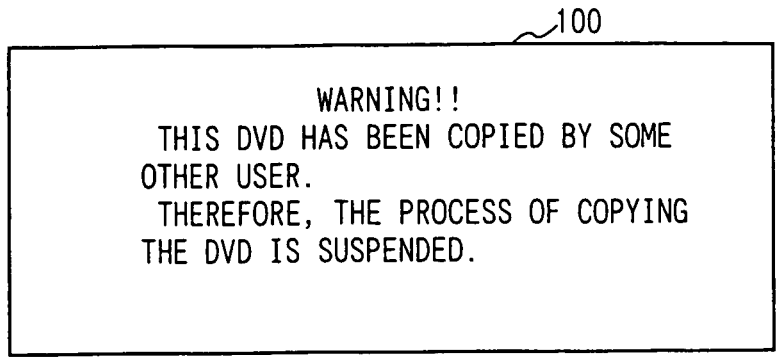
FIGS. 7A to 7C are schematic illustrations of the contents of warning images.

In Step SP10, the control section 27 of the hard-disk-containing DVD player 2A reads out the text data for warning prohibition of copying accumulated in advance in the data accumulating section 26 and displays a warning image 100 as shown in FIG. 7A on a television monitor screen (not shown) or the like by means of display control section 37. Thereafter, the control section 27 of the hard-disk-containing DVD player 2A moves to the next Step SP11.

If, on the other hand, the result of the above judgment in Step SP6 is positive, it means that the copying prohibition flag Ncp is "0" and hence the recorded contents of the DVD 10A are allowed to be copied by an authorized user by means of the hard-disk-containing DVD player 2A for the purpose of personal use. In this case, the control section 27 of the hard-disk-containing DVD player 2A moves to the next Step SP7.

In Step SP7, the control section 27 of the hard-disk-containing DVD player 2A drives the convolution section 32 to convolute the multiplexed signal S5, which has been obtained by driving the multiplexing section 23 to multiplex the title identifying information It "DVD000010" and the medium identifying information Iw of the DVD 10A and the apparatus identifying information Iddrv "HDD00150" of the hard-disk-containing DVD player 2A into a CSS decompressed data D3 in order to obtain a convoluted data D5 and then transmits the convoluted data D5 to Iddrv coding section 33. Thereafter, the control section 27 of the hard-disk-containing DVD player 2A moves to the next Step SP8.

In Step SP8, the control section 27 of the hard-disk-containing DVD player 2A encodes the convoluted data D5 to obtain data to be copied D6 by using the DES (Data Encryption Standard) method and the apparatus identifying information Iddrv "HDD00150", which operates as key, and then transmits the obtained data to be copied D6 to the hard disk 34. Thereafter, the control section 27 of the hard-disk-containing DVD player 2A moves to next Step SP9.

In Step SP9, the control section 27 of the hard-disk-containing DVD player 2A records the data to be copied D6 on the hard disk 34 and moves to the next Step SP11, where it terminates the copying process at the hard-disk-containing DVD player.

The recorded contents of the DVD 10A are copied to the hard disk 34 by the hard-disk-containing DVD player 2A of the contents copying management system 1 in a manner as described above.

Thus, since the hard-disk-containing DVD player 2A can take out the medium identifying information Iw specific to the DVD 10A loaded on it from a printing surface of the DVD 10A, it can identify the DVD 10A if it does not carry any other identification such as the manufacturing number on the recording surface thereof.

Additionally, the hard-disk-containing DVD player 2A is adapted to transmit the title identifying information It "DVD000010" and the medium identifying information Iw of the DVD 10A and the apparatus identifying information Iddrv "HDD000150" of the hard-disk-containing DVD player 2A to the management server 3 and enquire about the copying prohibition flag Ncp to find out if the contents of the DVD 10A are allowed to be copied or prohibited from being copied.

The management server 3 is adapted to generates a copying prohibition flag Ncp on the basis of the combination of the title identifying information It "DVD000010", and the medium identifying information Iw of the DVD 10A and the apparatus identifying information Iddrv "HDD000150" of the hard-disk-containing DVD player 2A it received and transmit the copying prohibition flag Ncp to the hard-disk-containing DVD player 2A.

Then, the hard-disk-containing DVD player 2A controls the operation of copying the recorded contents of the DVD 10A according to the copying prohibition flag Ncp it received.

With this arrangement, the hard-disk-containing DVD player 2A can control the operation of copying the recorded contents of the DVD 10A under the control of the management server 3. Thus, the authorized user can copy the recorded contents of the DVD 10A to the hard disk 34 only for the purpose of personal use when the recorded contents of the DVD 10A have not been copied by any hard-disk-containing DVD players other than the hard-disk-containing DVD player 2A.

On the other hand, the hard-disk-containing DVD player 2A can display a copying prohibition warning and prohibit copying of the recorded contents of the DVD 10A by means of the hard-disk-containing DVD player 2A when the recorded contents of the DVD 10A have been copied by some other hard-disk-containing DVD player, or when it is tried to copy the recorded contents of the DVD 10A that have been copied by some other hard-disk-containing DVD player.

Additionally, the hard-disk-containing DVD player 2A is adapted to take out the title identifying information It "DVD000010" from the loaded DVD 10A along with the medium identifying information Iw and transmit the two pieces of information to the management server 3.

Then, the management server 3 can limit the object of collation to the user identifying information data "U000001", "U000002", for instance, that has title identifying information It "DVD0000010" on the basis of the received title identifying information It "DVD0000010" of the DVD 10A. Therefore, the collation process can be simplified if compared with a case where it is performed without using the title identifying information It "DVD000010" of the DVD 10A.

(4) Copied Contents Reproduction Mode

Figure 8:
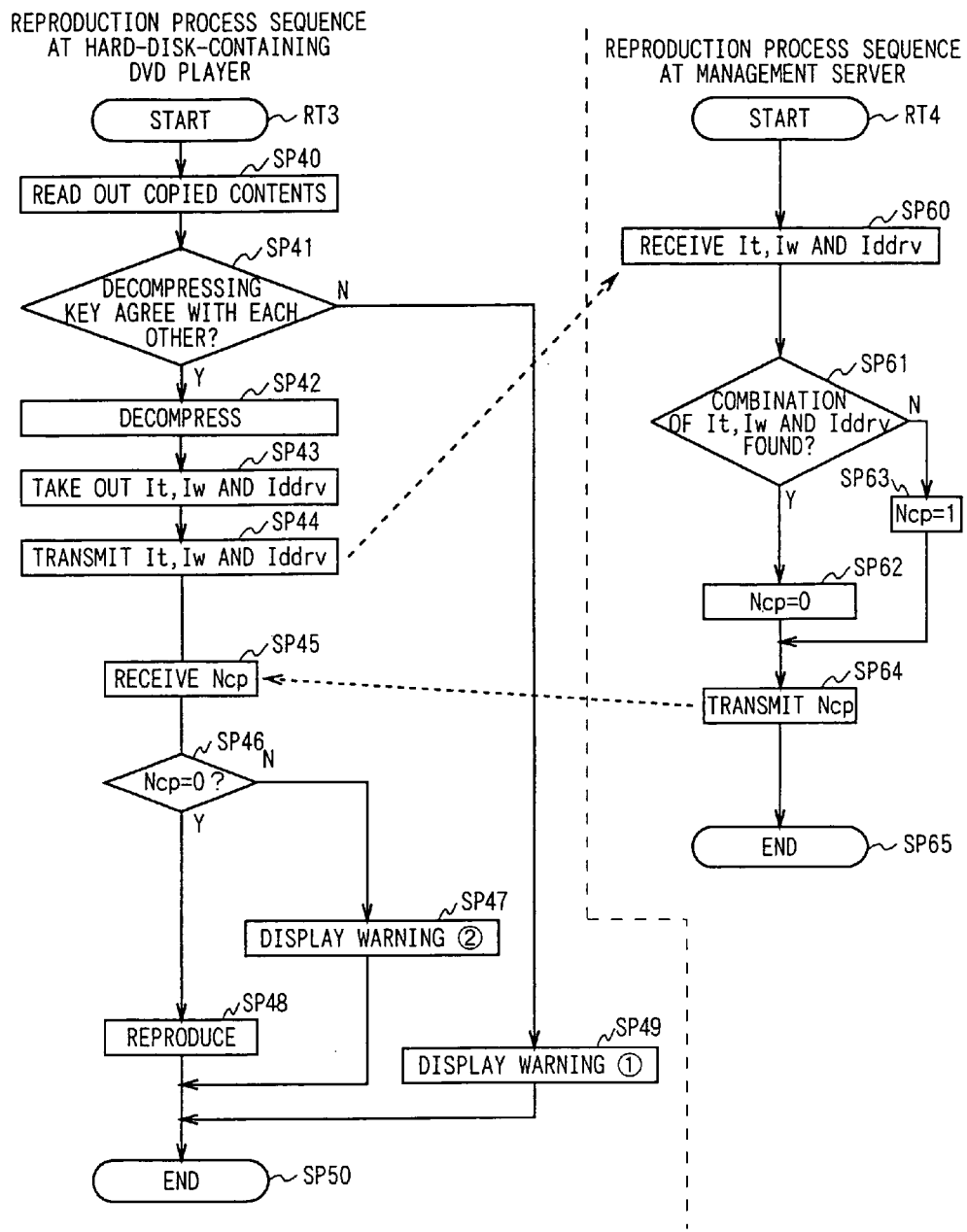
FIG. 8 is a flow chart illustrating the sequence of a process for replaying the copied contents.

Now, an operation of reproducing the copied contents obtained by copying the contents onto the hard disk 34 by means of the hard-disk-containing DVD player 2A of the contents copying management system 1 in a copied contents reproduction mode will be described by referring to the circuit diagrams of FIGS. 2 and 3 and the flow chart of FIG. 8.

In a copied contents reproduction mode, there are two processes including a reproduction process to be carried out by the hard-disk-containing DVD player and a reproduction management process to be carried out by the management server. The reproduction process to be carried out by the hard-disk-containing DVD player will be described first.

In the reproduction process at the side of the hard-disk-containing DVD player, the control section 27 of the hard-disk-containing DVD player 2A starts Routine RT3 and moves to Step SP40.

In Step SP40, the control section 27 of the hard-disk-containing DVD player 2A reads out the copied data D6 from the hard disk 34, which is the copied contents, and transmits the data D6 to Iddrv decompressing section 35. Then, it moves to Step SP41.

In Step SP41, the control section 27 of the hard-disk-containing DVD player 2A drives the Iddrv decompressing section 35 to actually decompress the copied data D6, using the apparatus identifying information Iddrv "HDD00150" of the hard-disk-containing DVD player 2A as key to find out if the convoluted data D5 prior to coding can be obtained or not and judges if the decompressing keys agree with each other or not on the basis of the outcome of the decompressing operation.

If the result of the above operation is negative, it means that the apparatus identifying information Iddrv "HDD00150" of the hard-disk-containing DVD player 2A is not the defrfeezing key for defeezing the copied data D6 and hence the copied data D6 cannot be properly decompressed because it has been copied by a hard-disk-containing DVD player other than the hard-disk-containing DVD player 2A. In this case, the control section 27 of the hard-disk-containing DVD player 2A moves to the next Step SP49.

Figure 7B:
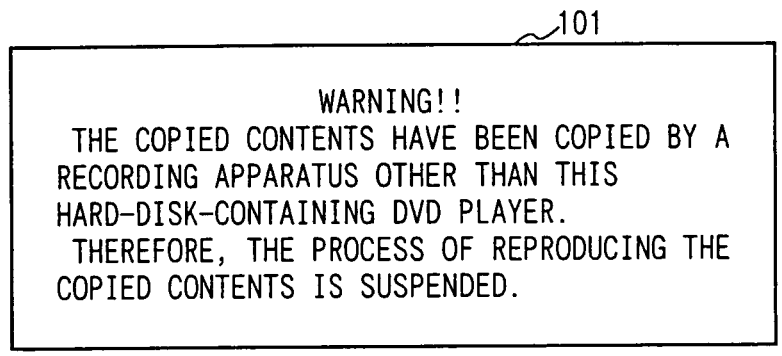

In Step SP49, the control section 27 of the hard-disk-containing DVD player 2A reads out the text data that has been accumulated in advance in the data accumulating section 26 for warning the prohibition of reproduction and drives display control section 37 to display a warning image 101 as shown in FIG. 7B on a display means, which is typically a television monitor (not shown). Thereafter, the control section 27 of the hard-disk-containing DVD player 2A moves to the next Step SP50.

If, on the other hand, the result of the above operation in Step SP41 is positive, it means that the apparatus identifying information Iddrv "HDD00150", of the hard-disk-containing DVD player 2A is the key for decompressing the copied data D6 and hence the copied data D6 can be properly decompressed because the copied data D6 has been copied by the hard-disk-containing DVD player 2A. In this case, the control section 27 of the hard-disk-containing DVD player 2A moves to the next Step SP42.

In Step SP42, the control section 27 of the hard-disk-containing DVD player 2A obtains the convoluted data D5 prior to coding by driving the Iddrv decompressing section 35 to decompress the copied data D6 by means of the above coding method, using the apparatus identifying information Iddrv "HDD00150" of the hard-disk-containing DVD player 2A as key, and then transmits the convoluted data D5 to It, Iw, Iddrv taking out section 36 and MPEG decoding section 39 before it moves to Step SP43.

In Step SP43, the control section 27 of the hard-disk-containing DVD player 2A drives the It, Iw, Iddrv taking out section 36 to take out the multiplexed signal S5 from the convoluted data D5 and transmits the data D5 to the transmission/reception section 24 and then moves to the next Step SP44.

In Step SP44, the control section 27 of the hard-disk-containing DVD player 2A drives the transmission/reception section 24 to carry out a predetermined transmission process on the multiplexed signal S5 and transmits the signal S5 to the management server 3 before it moves to the next Step SP45.

In this way, the control section 27 of the hard-disk-containing DVD player 2A is adapted to inform the management server 3 of the fact that the copied contents are the recorded contents of the DVD 10A that have been copied by the hard-disk-containing DVD player 2A by transmitting the title identifying information It "DVD000010", the medium identifying information Iw and the apparatus identifying information Iddrv "HDD00150" in the copied contents that have been read out from the hard disk 34 to the management server 3.

Then, the processing operation moves to the reproduction management process of the management server. The control section 51 of the management server 3 starts Routine RT4 and moves to Step SP60.

In Step SP60, the control section 51 of the management server 3 obtains the title identifying information It "DVD000010", the medium identifying information Iw and the apparatus identifying information Iddrv "HDD00150" in the copied contents that have been read out from the hard disk 34 of the hard-disk-containing DVD player 2A by receiving the multiplexed signal S5 transmitted from the hard-disk-containing DVD player 2A in Step SP44 at the transmission/reception section 52 and decoding it at the decoding section 53 and then moves to the next Step SP61.

In Step SP61, the control section 51 of the management server 3 carries out the process same the one from Step SP22 to Step SP30 contained in the copying process of the management server side as shown in FIG. 4.

More specifically, the control section 51 of the management server 3 collates the title identifying information It "DVD000010", the medium identifying information Iw and the apparatus identifying information Iddrv "HDD00150" in the copied contents with the user identifying information data "U000001", "U000002" in the identifying information database 55 at the collating section 50 and judges if user identifying information data having a combination same as the combination of the title identifying information It "DVD000010", the medium identifying information Iw and the apparatus identifying information Iddrv "HDD00150" in the copied contents is found in the identifying information database 55 or not on the basis of the outcome of the collation.

If the result of the above judgment is positive, it means that, for example, the user identifying information data "U000001" having a combination same as the combination of the title identifying information It "DVD000010", the medium identifying information Iw and the apparatus identifying information Iddrv "HDD00150" in the copied contents was registered in the identifying information database 55 when the copied contents were actually copied by means of the hard-disk-containing DVD player 2A and hence the copied contents are authorized to be reproduced by means of the hard-disk-containing DVD player 2A because they were copied by the authorized user by using the hard-disk-containing DVD player 2A for the purpose of personal use. In this case, the control section 51 of the management server 3 moves to the next Step SP62.

In Step SP62, the control section 51 of the management server 3 selects "0" for the copying prohibition flag Ncp and moves to Step SP64. Note that "0" is selected for the copying prohibition flag Ncp when the copied contents are authorized to be copied, whereas "1" is selected for the copying prohibition flag Ncp when the copied contents are prohibited from being copied.

If, on the other hand, the result of the above judgment in Step SP61 is negative, it means that the user identifying information data having a combination same as the combination of the title identifying information It "DVD000010", the medium identifying information Iw and the apparatus identifying information Iddrv "HDD00150" in the copied contents was not registered in the identifying information database 55 when the copied contents were actually copied by means of the hard-disk-containing DVD player 2A and hence the copied contents were actually illegally copied by an unauthorized user so that the copied contents are prohibited from being reproduced by the hard-disk-containing DVD player 2A. In this case, the control section 51 of the management server 3 moves to the next Step SP63.

In Step SP63, the control section 51 of the management server 3 selects "1", for the copying prohibition flag Ncp and then moves to the next Step SP64.

In Step SP64, the control section 51 of the management server 3 carries out a predetermined transmission process for the copying prohibition flag Ncp at the transmission/reception section 52 and subsequently transmits the flag Ncp to the hard-disk-containing DVD player 2A before it moves to the next Step SP65, where it terminates the reproduction management process of the management server.

Then, the processing operation returns to the side of the hard-disk-containing DVD player. In Step SP45, the control section 27 of the hard-disk-containing DVD player 2A receives at the transmission/reception section 24 the copying prohibition flag Ncp transmitted from the management server 3 in Step SP64 and moves to the next Step SP46.

In Step SP46, the control section 27 of the hard-disk-containing DVD player 2A judges if the copying prohibition flag Ncp shows "0" or not.

If the result of the above judgment is negative, it means that the copying prohibition flag Ncp shows "1" and reproduction of the copied contents by means of the hard-disk-containing DVD player 2A is prohibited because the copied contents that a user intends to reproduce are illegally copied contents. In this case, the control section 27 of the hard-disk-containing DVD player 2A moves to the next Step SP47.

Figure 7C:
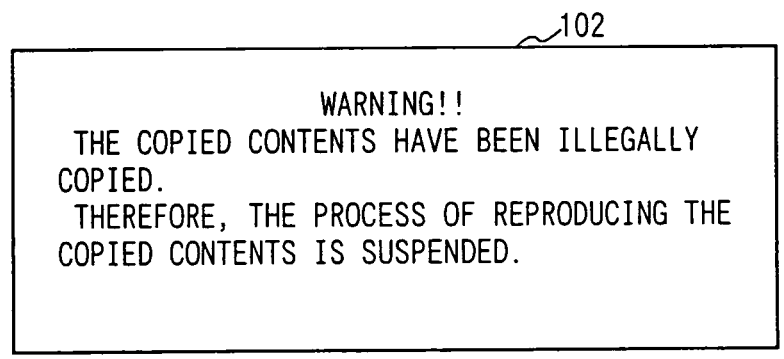

In Step SP47, the control section 27 of the hard-disk-containing DVD player 2A reads out the text data for warning prohibition of reproduction that is accumulated in advance in the data accumulating section 26 and drives the display control section 37 to display a warning image 102 as shown in FIG. 7C on the television monitor or the like (not shown) before it moves to the next Step SP50.

While the control section 27 of the hard-disk-containing DVD player 2A displays a warning message and prohibits any reproduction of the copied contents when the copying prohibition flag Ncp shows "1" in the above arrangement, it may alternatively be so arranged that the control section 27 of the hard-disk-containing DVD player 2A only displays a warning message.

If, on the other hand, the result of the judgment in Step SP46 is positive, it means that reproduction of the copied contents by means of the hard-disk-containing DVD player 2A is authorized because the copied contents to be reproduced are copied by an authorized user for the purpose of personal use. In this case, the control section 27 of the hard-disk-containing DVD player 2A moves to the next Step SP48.

In Step SP48, the control section 27 of the hard-disk-containing DVD player 2A obtains the video data D4 by driving the MPEG decoding section 39 to decode the convoluted data D5 and outputs the obtained video data to the television monitor or the like (not shown) by way of output section 40 before it moves to the next Step SP50, where it terminates the reproduction process at the hard-disk-containing DVD player.

The copied contents in the hard disk 34 are reproduced in a copied contents reproduction mode by the hard-disk-containing DVD player 2A of the contents copying management system 1 in the above described manner.

Thus, since the hard-disk-containing DVD player 2A can reproduce the copied contents in the hard disk 34 only when they can be decompressed properly by using the apparatus identifying information Iddrv "HDD00150" of the hard-disk-containing DVD player 2A as decompressing key, the system 1 can effectively prevent any hard-disk-containing DVD players other than the hard-disk-containing DVD player 2A from reproducing the copied contents that have been copied by the hard-disk-containing DVD player 2A.

Additionally, the hard-disk-containing DVD player 2A is so adapted that it takes out the title identifying information It "DVD000010", the medium identifying information Iw and the apparatus identifying information Iddrv "HDD000150" from the copied contents that have been read out from the hard disk 34 and transmits those pieces of information to the management server 3 in order to enquire about the copying prohibition flag Ncp.

On the other hand, the management server 3 is so adapted that it generates a copying prohibition flag Ncp on the basis of the combination of the title identifying information It "DVD000010", the medium identifying information Iw and the apparatus identifying information Iddrv "HDD000150" it has received and transmits the generated copying prohibition flag Ncp to the hard-disk-containing DVD player 2A.

Then, the hard-disk-containing DVD player 2A controls reproduction of the copied contents according to the received copying prohibition flag Ncp.

With the above described arrangement, the hard-disk-containing DVD player 2A can control reproduction of the copied contents under the control of the management server 3 so that it can reproduce the copied contents only when they are authorized to be reproduced by means of the hard-disk-containing DVD player 2A but prohibits reproduction of the copied contents by displaying a warning image 101 or 102 for prohibition of reproduction when it is prohibited to reproduce the copied contents by means of the hard-disk-containing DVD player 2A.

(5) Operations and Advantages

With the above described arrangement, in a contents copying mode for copying the recorded contents of the DVD 10A, the hard-disk-containing DVD player 2A takes out the title identifying information It "DVD000010" and the medium identifying information Iw for identifying the DVD 10A and transmits the title identifying information It "DVD000010" and the medium identifying information Iw to the management server 3 along with the apparatus identifying information Iddrv "HDD00050" of the hard-disk-containing DVD player 2.

Then, the management server 3 collates the combination of the title identifying information It "DVD000010", the medium identifying information Iw of the DVD 10A and the apparatus identifying information Iddrv "HDD000150" transmitted from the hard-disk-containing DVD player 2A with the data in the identifying information database 55 and judges if user identifying information data having a combination same as the combination of the title identifying information It "DVD000010", the medium identifying information Iw of the DVD 10A and the apparatus identifying information Iddrv "HDD000150" is found in the identifying information database 55 or not on the basis of the result of the collation.

If, as a result, user identifying information data "U000001" having a combination same as the combination of the title identifying information It "DVD000010", the medium identifying information Iw of the DVD 10A and the apparatus identifying information Iddrv "HDD000150" is found in the identifying information database 55, the management server 3 judges that the recorded contents of the DVD 10A are those that are authorized to be copied only by means of the hard-disk-containing DVD player 2A. Then the management server 3 generates a copying prohibition flag Ncp "0" indicating that copying is authorized and transmits the copying prohibition flag Ncp "0" to the hard-disk-containing DVD player 2A.

If, on the other hand, user identifying information data having a combination same as the combination of the title identifying information It "DVD000010", the medium identifying information Iw of the DVD 10A and the apparatus identifying information Iddrv "HDD000150" is not found in the identifying information database 55, the management server 3 judges that the recorded contents of the DVD 10A are those that are prohibited from being copied by means of the hard-disk-containing DVD player 2A. Then the management server 3 generates a copying prohibition flag Ncp "1" indicating that copying is prohibited and transmits the copying prohibition flag Ncp "1" to the hard-disk-containing DVD player 2A.

Then, the hard-disk-containing DVD player 2A controls copying of the recorded contents of the DVD 10A according to the copying prohibition flag Ncp transmitted from the management server 3. When the hard-disk-containing DVD player 2A copies the recorded contents, it firstly convolutes the title identifying information It "DVD000010", the medium identifying information Iw and the apparatus identifying information Iddrv "HDD000150" into the recorded contents and then encodes the data, using the apparatus identifying information Iddrv "HDD000150" as key before the hard-disk-containing DBVD player 2A actually copies the recorded contents onto the hard disk 34.

Thus, the hard-disk-containing DVD player 2A identifies the loaded DVD 10A and controls the copying operation under the control of the management server 3 in such a way that the operation of copying the recorded contents of the DVD 10A is authorized only when the authorized user does it for the purpose of personal use.

In a copied contents reproduction mode in which the copied contents copied onto the hard disk 34 are reproduced, the hard-disk-containing DVD player 2A decompresses the encoded copied contents by using the apparatus identifying information Iddrv "HDD000150" as key and takes out the title identifying information It "DVD0000010", the medium identifying information Iw and the apparatus identifying information Iddrv "HDD0000150" convoluted into the decompressed copied contents from the copied contents. Then, the hard-disk-containing DVD player 2A transmits the title identifying information It "DVD000010", the medium identifying information Iw and the apparatus identifying information Iddrv "HDD000150" to the management server 3.

The management server 3 collates the combination of the title identifying information It "DVD00001", the medium identifying information Iw and the apparatus identifying information Iddrv "HDD000150" in the copied contents as transmitted from the hard-disk-containing DVD player 2A with the data in the identifying information database 55 and judges if a user identifying information data having a combination same as the combination of the title identifying information It "DVD000010", the medium identifying information Iw and the apparatus identifying information Iddrv "HDD000150" in the copied contents is found in the identifying information database 55 or not on the basis of the outcome of the collation.

If, as a result, user identifying information data "U000001" having a combination same as the combination of the title identifying information It "DVD000010", the medium identifying information Iw and the apparatus identifying information Iddrv "HDD000150", is found in the identifying information database 55, the management server 3 judges that the copied contents are those that have been copied by an authorized user by means of the hard-disk-containing DVD player 2A for the purpose of personal use and are authorized to be reproduced by means of the hard-disk-containing DVD player 2A. Then the management server 3 generates a copying prohibition flag Ncp "0" indicating that reproduction is authorized and transmits the copying prohibition flag Ncp "0" to the hard-disk-containing DVD player 2A.

If, on the other hand, user identifying information data having a combination same as the combination of the title identifying information It "DVD0000010", the medium identifying information Iw and the apparatus identifying information Iddrv "HDD000150" is not found in the identifying information database 55, the management server 3 judges that the copied contents are those that have been illegally copied by an unauthorized user and are prohibited from being reproduced by means of the hard-disk-containing DVD player 2A. Then the management server 3 generates a copying prohibition flag Ncp "1" indicating that reproduction is prohibited and transmits the copying prohibition flag Ncp "1" to the hard-disk-containing DVD player 2A.

Thus, the hard-disk-containing DVD player 2A identifies the copied contents and controls the reproducing operation under the control of the management server 3 in such a way that the operation of reproducing the copied contents is authorized only when the authorized user does it for the purpose of personal use.

With the above described arrangement; when the hard-disk-containing DVD player 2A of the contents copying management system 1 copies the recorded contents of the loaded DVD 10A, it encodes the recorded contents, using the apparatus identifying information Iddvr "HDD000150" of the hard-disk-containing DVD player 2A as key, and subsequently actually copies the recorded contents onto the hard disk 34 so that the system 1 can effectively prevent any hard-disk-containing DVD players other than the hard-disk-containing DVD player 2A from reproducing the copied contents.

Additionally, when the hard-disk-containing DVD player 2A copies the recorded contents of the loaded DVD 10A or when it reproduces the copied contents that have been copied onto the hard disk 34, it takes out the title identifying information It "DVD000010" and the medium identifying information Iw to be used for identifying the copied contents and the DVD 10A and transmits those pieces of information to the management server 3 along with the apparatus identifying information "HDD000150" of the hard-disk-containing DVD player 2A to enquire about the copying prohibition flag Ncp so that it can obtain the copying prohibition flag Ncp and control copying and reproduction according to the copying prohibition flag Ncp.

Thus, with this arrangement, the hard-disk-containing DVD player 2A allows only the authorized user to copy the recorded contents of the loaded DVD 10A under the control of the management server 3. The DVD player 2A also allows only the authorized user to reproduce the copied contents copied onto the hard disk 34 only when the copied contents have been copied by the authorized user under the control of the management server 3.

(6) Other Embodiments

While the luminance signal obtained by picking up an image of the printing surface of the DVD 10A by means of the CMOS camera 20 is used as medium identifying information in the above described embodiment, the present invention is by no means limited thereto and an optical signal obtained by picking up a piece of information that can be used to identify the DVD 10A may alternatively be used. Such a piece of information may be one or more than one ink bleedings from the edges of printed areas, defective printed areas, the thickness of the applied ink, the unevenness of the printing surface, eccentricity of the printed areas, the extent of permeation of ink through the printing surface, the extent of polarization of the printing surface, the scars of the printing surface or some other phenomenon.

Additionally, while the title identifying information It "DVD000010" and the medium identifying information Iw of the DVD 10A and the apparatus identifying information "HDD000150" of the hard-disk-containing DVD player 2A are used as copying-related combination information in the above described embodiment, the present invention is by no means limited thereto and only the medium identifying information Iw and the apparatus identifying information "HDD000150" may be used to omit the use of the title identifying information It "DVD000010".

Furthermore, a CMOS camera 20 is used as medium identifying information acquiring means in the above described embodiment, the present invention is by no means limited thereto and a CCD (charge coupled device) camera or some other image pickup device may alternatively be used to pick up an image of the printing surface of the DVD 10A.

Furthermore, a CMOS camera 20 is used as medium identifying information acquiring means in the above described embodiment, the present invention is by no means limited thereto and the OP 28 may alternatively be used to acquire the medium identifying information. If such is the case, medium identifying information that the OP 28 can acquire may be a signal specific to the medium such as a BCA (burst cutting area) that is recorded in advance in each medium, a signal error pattern recorded on the medium, a signal jitter, a signal amplitude fluctuation pattern attributable to the material of the medium or some other piece of information. Then, the OP 28 can operate for both reading the signal recorded on the recording surface of the DVD 10A and acquiring the medium identifying information of the DVD 10A so that it is no longer necessary that the hard-disk-containing DVD player 2A contains a CMOS camera 20 and hence the circuit configuration of the hard-disk-containing DVD player 2A can be simplified.

Furthermore, while the above embodiment is described in terms of an instance where the recorded contents of the DVD 10A are copied onto the hard disk 34, the present invention is by no means limited thereto and the recorded contents of the DVD 10A may alternatively be copied onto some other recording medium such as DVD-R.

Furthermore, while only the hard-disk-containing DVD 2A that has copied the recorded contents of the DVD 10A first is authorized to copy the recorded contents of the DVD 10A and reproduce the copied contents in the above description of the embodiment, the present invention is by no means limited thereto and, if the user's family owns a plurality of hard-disk-containing DVD players in the same house, pieces of apparatus identifying information of the plurality of hard-disk-containing DVD players of the family such as "HDD000150" and "HDD001030" may be controlled as a single group ID "UG00001" by the management server 3. Then, any of the DVD players of the family having the group ID "UG00001" may be allowed to copy the contents recorded on the DVD 10A and reproducing the copied contents.

Furthermore, the operation of reproducing the recorded contents of the DVD 10A is conducted like that of an ordinary DVD player in the above description of the embodiment, the present invention is by no means limited thereto and it may alternatively be so arranged that the hard-disk-containing DVD player 2A enquires of the management server 3 the copying prohibition flag Ncp as copying authorizing information in order to control the contents reproducing operation whenever the recorded contents of the DVD 10A are reproduced.

Then, if a rental DVD shop, for instance, is responsible for the operation of the management server 3, it may be so arranged that the recorded contents are prohibited from being reproduced after the expiration of the lease of the rented DVD 10A and the recorded contents of the rented DVD 10A are prohibited from being copied from the beginning of the lease.

Furthermore, while a multiplexed signal S5 is obtained at the time of copying the recorded contents by multiplexing the title identifying information It "DVD000010", the medium identifying information Iw and the apparatus identifying information Iddrv "HDD000150" and convoluted into the CSS decompressed data D3 at the convolution section 32 in the above description of the embodiment, the present invention is by no means limited thereto and it may alternatively be so arranged that the multiplexed signal S5 is convoluted into the CSS decompressed data D3 at the convolution section 32 and accumulated in the data accumulating section 26.

Then, the control section 27 of the hard-disk-containing DVD player 2A transmits the multiplexed signal S5 accumulated in the data accumulating section 26 to the management server 3 at a time other than the time of reproducing the copied contents that have been copied onto the hard disk 34 and obtains the copying prohibition flag Ncp. If such is the case, there may be provided a copied contents confirmation mode in which a warning image is displayed when the obtained copying prohibition flag Ncp indicates prohibition of copying and hence the copied contents in the hard disk 34 are those that have been illegally copied.

Furthermore, while the copied contents are allowed to be decompressed only when the key used for encoding the copied contents and the key of the hard-disk-containing DVD player 2A that is trying to reproduce the contents agree with each other at the time of reproducing the copied contents in the above description of the embodiment, the present invention is by no means limited thereto and it may alternatively be so arranged that the hard-disk-containing DVD player 2A receives the key of the copied contents from the management server 3 and decompresses the copied contents by paying the charged compensation to the management server 3.

Furthermore, while the user of a DVD 10A is described as original recording medium in the above description of the embodiment, the present invention is by no means limited thereto and some other disk-shaped recording medium such as CD, LD or Divx (digital video express) may alternatively be used.

Furthermore, while the above described embodiment involves the use of a hard-disk-containing DVD player 2A that comprises a CMOS camera 20 that operates as medium identifying information acquiring means, a filter section 21, a clock adding section 22, a transmission/reception section 24 that operates as copying-related combination information transmission/reception means and a control section 27 that operates as apparatus identifying information acquiring means and control means, the present invention is by no means limited thereto and the hard-disk-containing DVD player 2A alternatively may have a different circuit configuration.

Furthermore, while the above described embodiment involves the use of a management server 3 that comprises an identifying information database 55 that operates as memory means, an Iw accumulating section 54, a control section 51 that operates as copying authorizing information generating means and a transmission/reception section 52 that operates as copying authorizing information transmission means, the present invention is by no means limited thereto and the management server 3 alternatively may have a different circuit configuration.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A contents copying management system configured by connecting a contents copying apparatus and a copying management device by a network,
    said contents copying apparatus comprising:
        a controller configured to acquire medium identifying information specific to and uniquely characterizing one recorded-contents-carrying original recording medium including contents to be copied by imaging by a camera a printed surface of the one recorded-contents-carrying original recording medium to generate a luminance signal, and generating the medium identifying information by starting an operation of generating the luminance signal based on a physical address recorded on a recording surface of the recorded-contents-carrying original recording medium;
        the controller further configured to acquire apparatus identifying information specific to and indicating said contents copying apparatus itself;
        a first transmission/reception section that transmits said medium identifying information and said apparatus identifying information to said copying management device as copying-related combination information;
        the first transmission/reception section further receives copying authorizing information generated by said copying management device on the basis of said copying-related combination information at the time of accessing said copying management device, after transmitting said medium identifying information; and
        the controller further configured to control an operation of copying said contents from said original recording medium in response to said copying authorizing information;
    said copying management device comprising:
        a database that registers and stores said copying-related combination information received from said contents copying apparatus in advance;
        a control section configured to compare said copying-related combination information received at the time of access by said contents copying apparatus with said copying-related combination information registered in said database in advance, that judges agreement or disagreement of said combinations of medium identifying information and apparatus identifying information, and that generates copying authorizing information for authorizing an operation of copying the contents in response to agreement of said combinations but that generates copying non-authorizing information for not authorizing any operation of copying the contents in response to disagreement of said combinations; and
        a second transmission/reception section that transmits said copying authorizing information to said contents copying apparatus.

2. A system according to claim 1, wherein said controller is further configured to control reproduction of said copied contents according to said copying authorizing information.

3. A system according to claim 1, wherein said controller is further configured to control copying of said contents according to said copying authorizing information and displays a predetermined warning image on a display when copying is not authorized according to said copying authorizing information.

4. A system according to claim 1, wherein said database registers said medium identifying information according to a title of said contents on a title by title basis when registering and storing in advance said copying-related combination information received from said contents copying apparatus, and said control section is further configured to select said medium identifying information to be compared according to said title when it compares said copying-related combination information received at the time of said access of said contents copying apparatus with said copying-related combination information registered in advance in said database.

5. A system according to claim 1, wherein
said controller is further configured to generate the contents to be copied, convoluting said medium identifying information and said apparatus identifying information into said contents, when copying said contents, and to control reproduction of said copied contents by taking out the medium identifying information and the apparatus identifying information from said copied contents, to transmit the combined information to said copying management device by said first transmission/reaction section and to receive said copying authorizing information generated by said copying management device on the basis of the combination of the medium identifying information and apparatus identifying information when reproducing said copied contents.

6. A system according to claim 1, wherein
said controller is further configured to generate the contents to be copied, convoluting said medium identifying information and said apparatus identifying information into said contents, and to additionally store the medium identifying information and the apparatus identifying information in said recording/reproducing apparatus when carrying out an operation of copying said contents and to confirm if said copied contents are authorized to be copied according to the copying authorizing information obtained by taking out the medium identifying information and the apparatus identifying information, to transmit the combined information to said copying management device by said first transmission/reception section to receive said copying authorizing information generated by said copying management device on the basis of the combination of the medium identifying information and apparatus identifying information when the copied contents are not reproduced.

7. A system according to claim 1, wherein
said controller is further configured to encode the contents, using said apparatus identifying information as key, when carrying out an operation of copying said contents.

8. A copying management device comprising:
a transmission/reception section that receives: medium identifying information specific to and uniquely characterizing one recorded-contents-carrying original recording medium including contents to be copied by imaging by a camera a printed surface of the one recorded-contents-carrying original recording medium to generate a luminance signal, and generating the medium identifying information by starting an operation of generating the luminance signal based on a physical address recorded on a recording surface of the recorded-contents-carrying original recording medium; and apparatus identifying information specific to and indicating a contents copying apparatus itself from said contents copying apparatus as copying-related combination information at the time of copying said contents from said original recording medium by a network;
a database that registers and stores said copying-related combination information received from said contents copying apparatus in advance;
a control section configured to compare said copying-related combination information received at the time of access by said contents copying apparatus with said copying-related combination information registered in said database in advance, to determine agreement or disagreement of said combinations of medium identifying information and apparatus identifying information, to generate copying authorizing information for authorizing an operation of copying the contents from said original recording medium in response to agreement of said combinations but to generate copying non-authorizing information for not authorizing any operation of copying the contents in response to disagreement of said combinations; and
the transmission/reception section further transmits said copying authorizing information to said contents copying apparatus, wherein
said copying management device controlling copying of said contents by said contents copying apparatus from said recorded-contents-carrying original recording medium according to said copying authorizing information with respect to each recorded-contents-carrying original recording medium.

9. A contents copying apparatus comprising:
a controller configured to acquire medium identifying information specific to and uniquely characterizing one recorded-contents-carrying original recording medium including contents to be copied by imaging by a camera a printed surface of the one recorded-contents-carrying original recording medium to generate a luminance signal, and generating the medium identifying information by starting an operation of generating the luminance signal based on a physical address recorded on a recording surface of the recorded-contents-carrying original recording medium;
the controller further configured to acquire apparatus identifying information specific to and indicating said contents copying apparatus itself;
a transmission/reception section configured to transmit said medium identifying information and said apparatus identifying information to a copying management device connected to it by a network as copying-related combination information;
the transmission/reception section further configured to receive copying authorizing information generated after registration of said copying-related combination information by said copying management device by comparing said copying-related combination information transmitted at the time of a new access to said copying management device, after the transmitting said medium identifying information, with said copying-related combination information registered in advance, and to authorize an operation of copying the contents from said original recording medium in response to agreement of said combinations of medium identifying information and apparatus identifying information but not authorizing any operation of copying the contents in response to disagreement of said combinations from said copying management device; and
the controller further configured to control the operation of copying according to said copying authorizing information.

* * * * *